United States Patent [19]
Boyle et al.

[11] 3,894,625
[45] July 15, 1975

[54] LUMBER SORTING SYSTEM WITH OVERHEAD INFEED

[75] Inventors: John S. Boyle, Beaverton; R. Burl Romick, Portland, both of Oreg.

[73] Assignee: U.S. Natural Resources, Inc., Portland, Oreg.

[22] Filed: Aug. 24, 1972

[21] Appl. No.: 283,317

[52] U.S. Cl................. 198/20 R; 198/102; 209/73
[51] Int. Cl............................................ B65g 47/00
[58] Field of Search.... 83/94, 110, 112, 155, 155.1; 198/20 R, 33 AA, 34, 102, 232, 159, 177 R, 220 A; 209/74 R, 73

[56] References Cited
UNITED STATES PATENTS

| | | | |
|---|---|---|---|
| 433,800 | 8/1890 | Mayo | 198/102 X |
| 683,039 | 9/1901 | Hagen | 198/102 |
| 2,828,917 | 4/1958 | Wheeler | 198/34 X |
| 2,879,885 | 3/1959 | Myers | 198/232 |
| 3,254,764 | 6/1966 | Boyle | 209/73 |
| 3,700,120 | 10/1972 | Romick | 209/74 R |

*Primary Examiner*—Evon C. Blunk
*Assistant Examiner*—Douglas D. Watts
*Attorney, Agent, or Firm*—Klarquist, Sparkman, Campbell, Leigh, Hall & Whinston

[57] ABSTRACT

A lumber drop sorter has an overhead infeed conveyor system which delivers boards transversely and one at a time onto the upper run of the sorter conveyor chains in the spaces between lumber-supporting hooks carried by such chains. A speed-up chain system along the upper run downstream of the board infeed point accelerates each delivered board into the forwardly adjacent hooks before the board reaches the downwardly traveling end run of the sorter chains. The infeed system includes descending lugged conveyor chains extending from an overlying horizontal infeed conveyor toward the upper run and driven in timed relation to the sorter chains. Short lumber slides pivoted to the lower ends of the descending lugged chains deliver each board generally horizontally and gently onto the upper run. The chainways for the descending lugged chains are pivoted to the tail shaft of the overlying conveyor to prevent jamming. In one form of the apparatus board-measuring, grading and other processing equipment is provided along the upper run downstream of the board delivery point. In another form of the invention such equipment is provided along the overlying infeed conveyor.

41 Claims, 8 Drawing Figures

LUMBER SORTING SYSTEM WITH OVERHEAD INFEED

BACKGROUND OF THE INVENTION

1. Field of the Invention

The present invention relates to lumber-sorting apparatus, and especially to infeed systems for lumber sorters and related apparatus.

2. Description of the Prior Art

Drop sorters are commonly used in the lumber industry to separate boards according to length, width, species, quality or other criteria into piles for subsequent stacking, packaging or other processing. Such sorters have a series of horizontally extending laterally spaced endless conveyor chains with hooks for carrying the lumber. When individual boards are carried by the hooks along the lower run of the chains, the boards are selectively brushed from the hooks into bins or carts stationed beneath the lower run. The hooks usually open rearwardly with respect to the direction of travel of the chains to facilitate feeding the boards into the hooks and removing them therefrom. In the past, feeding boards into the hooks has presented certain problems due primarily to the speed at which the hooks travel, the variable sizes, weights and other qualities of the boards being sorted and other factors.

Some infeed systems for feeding boards into the hooks of a drop sorter have been so-called undershot systems wherein a horizontal infeed conveyor at approximately the same level as the lower run of the sorter chains accelerates a board into a set of hooks just as the hooks start their horizontal travel along the lower run. This method of infeed requires critical timing in that the board must be accelerated into the hooks just as they turn the corner from the vertically traveling run of the sorter chains to the horizontal run. If the board arrives a moment too early or too late, it will miss the intended set of hooks completely and drop to an unintended point below the sorter.

Another known type of infeed, commonly called an end-drop infeed, involves dropping each board into a set of hooks as the hooks travel vertically along a downwardly traveling end run of the chains, from the upper toward the lower run, using gravity to accelerate each board into a set of hooks. A horizontal lugged chain infeed conveyor delivers each board to the infeed end of the sorter chains in timed relation to the arrival of a corresponding set of hooks at such end. Although timing in an end-drop infeed is not quite so critical as with the undershot infeed, it is still quite critical, and a board arriving too early or too late may miss the intended hooks. Moreover, problems with boards jamming between the infeed conveyor and the sorter chains have been encountered because of the high speed delivery of boards to the sorter chains and their sudden change of direction from horizontal to vertical as they are fed against such vertically traveling chains.

Additional problems are created in feeding boards to drop sorters of the recirculating type, which are designed to return boards from the lower run of the sorter chains back to the upper run and eventually back to the lower run for sorting when for some reason the board is not sorted in its first pass along the lower run. With such recirculating drop sorters, means must be provided to prevent the infeed system from feeding a board into a set of hooks that is already occupied by a recirculating board.

An additional disadvantage of the use of either the undershot infeed or the end-drop infeed is the large floor or ground space occupied by the usually very long drop sorter and its infeed conveyor, which forms an endwise extension of the drop sorter. The infeed conveyor system itself is usually very long because of the preliminary board-processing operations that are typically performed along the infeed conveyor, such operations commonly including unscrambling, board-turning and grading, end alignment, board-trimming to length, grade stamping, sort selection, and other functions.

A prior U.S. Pat. No. 2,902,150 has suggested the use of a sorter infeed system that delivers boards onto the upper run of the sorter chains from a point above the upper run. However, in such prior system the infeed to the sorter is not positive because boards are delivered under the influence of gravity along a long, declining slideway from an overhead horizontal conveyor. Thus boards are delivered at a relatively constant speed as determined by the slope and coefficient of friction of the slideway, without regard to the speed of the sorter conveyor. Therefore, any change in the speed of the sorter conveyor, which is not uncommon, or variations in the frictional resistance to sliding of different boards, which also is not uncommon, is bound to create timing and therefore possible jamming problems.

The prior overhead infeed of the aforementioned patent is also, in reality, only a modified end-drop infeed because it relies on gravity rather than a positive force to accelerate the boards into the sorter hooks as the hooks turn downwardly at one end of the sorter. Here again, therefore, timing problems can arise because of board variations.

Furthermore, such prior overhead infeed system cannot be used with a recirculating drop sorter.

Because of the foregoing problems with prior sorter infeed systems, there is still a need for a more foolproof and less space-consuming infeed system that will feed boards positively into the hooks of a drop sorter without the jamming and timing problems of prior infeed systems and that is adapted for use with a recirculating drop sorter.

SUMMARY OF THE INVENTION

The present invention is an improved overhead infeed system for a lumber sorter and especially a lumber sorter of the drop sorter type utilizing endless conveyor chains and board-conveying elements at spaced intervals along such chains.

According to the present invention, the problems of the prior art are overcome by providing an infeed system that feeds boards onto the upper run of the sorter conveyor at a controlled speed in timed relation to the speed of the sorter conveyor so that boards are delivered positively into the spaces between hooks on the upper run.

According to another aspect of the invention, boards delivered to the upper run of the sorter conveyor are accelerated positively into a set of supporting hooks as the hooks travel along the upper run.

According to still another aspect of the invention, means are provided for sensing board-created problems such as a skewed or broken board, while the board creating the problem travels along the upper run, thereby providing time for correcting the problem before it leads to more serious problems such as sorter malfunction or damage.

In another aspect of the invention, means are provided to accomodate recirculating boards and to permit such boards to bypass the feed point on the upper run without causing jamming problems.

In yet another aspect of the invention, boards are graded, positioned, trimmed to length, measured, grade-stamped or otherwise processed on the upper run of the sorter, thereby eliminating much of the long infeed conveyor section formerly required to accomplish this processing and reducing considerably the length of memory required in the sort control system.

According to a preferred embodiment of the invention, the overhead infeed utilizes a descending infeed conveyor and preferably one utilizing lugged conveyor chains to control the rate of descent and time the delivery of boards to the sorter.

Another feature of a preferred embodiment of the invention is a speed-up chain system along the upper run to accelerate boards positively into the sorter hooks while traveling on the upper run.

A further feature of the preferred embodiment is the pivotal mounting of the descending infeed conveyor or at least a lower portion thereof to permit recirculating boards to pass by the infeed point on the upper run.

According to another feature of the preferred embodiment, control means are provided to prevent the infeed systems from feeding a board into a hook space on the sorter already occupied by a recirculating board.

The foregoing objects, features and advantages of the present invention will become more apparent from the following description which proceeds with reference to the accompanying drawings.

DETAILED DESCRIPTION

General Arrangement

Figure 1:
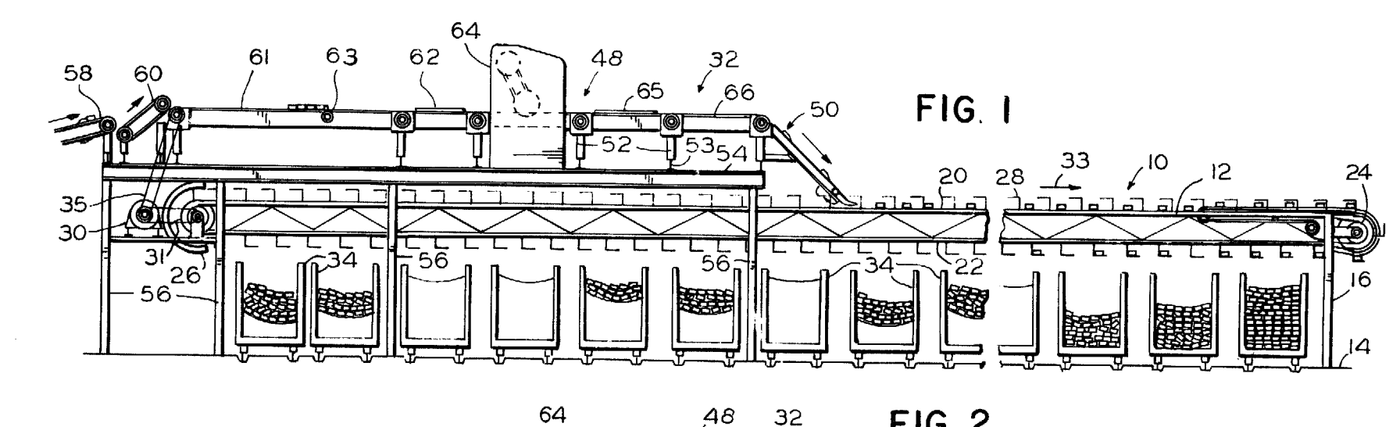
FIG. 1 is a somewhat schematic side elevational view of a lumber sorter incorporating the improved overhead infeed system of the invention.
Figure 2:
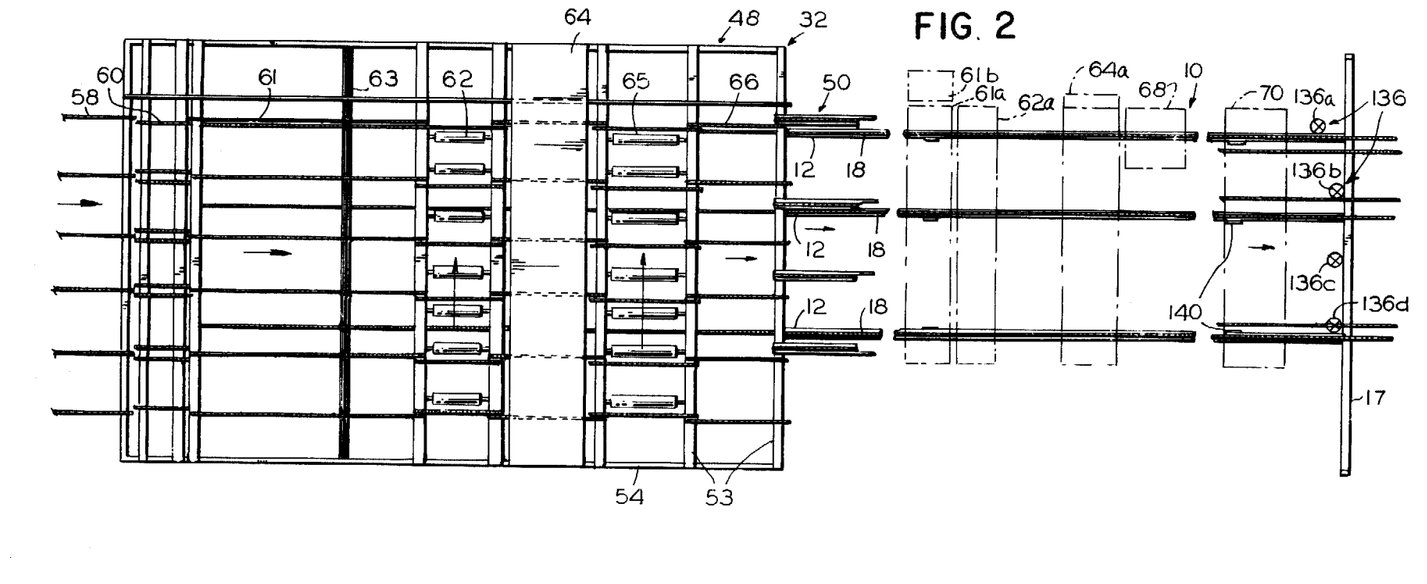
FIG. 2 is a top plan view of the system of FIG. 1 showing in phantom lines a possible modification of the arrangement shown in solid lines.

With reference to the drawings, FIGS. 1 and 2 show a typical lumber drop sorter indicated generally at 10 and comprising a laterally spaced series of long truss frames 12 supported above ground or floor level 14 by vertical columns 16 and horizontal cross beams 17. The truss frames define chainways for supporting a series of at least two, and in this case three, laterally spaced-apart endless sorter conveyor chains 18 having a horizontally extending upper run 20, a parallel lower run 22, a downwardly traveling end run 24 and an upwardly traveling end run 26. Each of the three sorter conveyor chains carries a series of equally longitudinally spaced-apart generally hook- or L-shaped lumber-supporting hook means 28. The hooks 28 of each sorter chain are laterally aligned with corresponding hooks of the other sorter chains so that boards of various lengths can be supported transversely on the aligned hooks of at least two of the three chains.

A motor 30 drives the sorter chains through a chain-and-sprocket drive system 31 at a sorter end 26. The motor is also used to drive the sorter infeed system indicated generally at 32 in timed relation to the sorter conveyor through a similar chain-and-sprocket drive 35. The sorter chains are driven continuously in the direction of the arrow 33 in FIG. 1, and the infeed system is driven in the same general direction.

Figure 6:
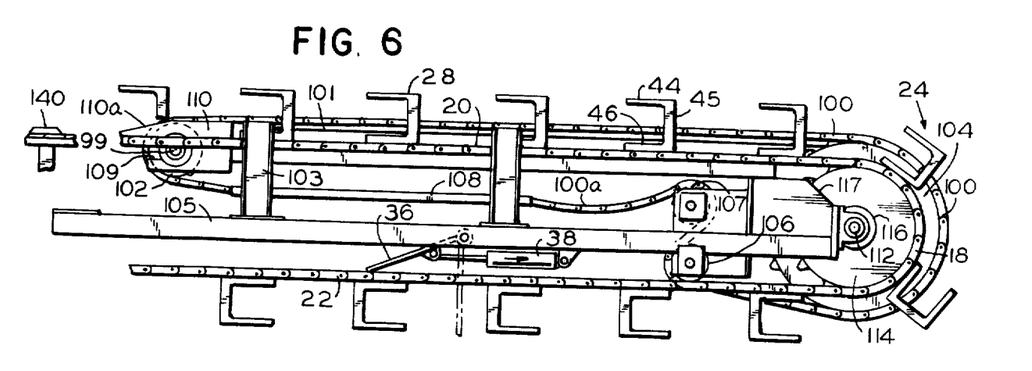
FIG. 6 is an enlarged side elevational view of the downwardly traveling end portion of the sorter of FIG. 1 showing the speed-up chain section.

Lumber-supporting hooks 28 are mounted on the sorter chains so that the hooks open rearwardly with respect to their direction of travel. Each set of hooks carries a board along the lower run 22 over a series of board-collecting bins or carts, with carts 34 being shown in FIG. 1, in various stages of being filled. The carts shown are of the type shown and described in greater detail in co-pending application Ser. No. 181,667, filed Sept. 20, 1971. Such carts or any of a wide variety of other board-collecting bins, carts or other devices well known in the art may be used in place of the carts shown. The sorter includes board-diverting means above each board-collecting station along the lower run for selectively brushing designated boards into preselected bins according to length, width, or other grade criteria as desired. A typical diverter arm 36 is shown in FIG. 6 in its retracted position, such arm being movable to its extended board-diverting position shown in dashed lines by a fluid power-operated cylinder 38.

The illustrated drop sorter is of the well-known recirculating type described in detail in U.S. Pat. No. 3,254,764 to J. S. Boyle. In such a sorter, boards which are not diverted from their supporting hooks as they travel during a first pass along the lower run are returned to the upper run and recirculated into a selected bin. Recirculation occurs, for example, when a selected bin or cart is full or in the process of being emptied. The recirculating feature of the conveyor is shown clearly in FIG. 8 at the upwardly traveling end portion 26 of the sorter. The recirculating means includes at least two laterally spaced curved slide members 40, each having a lower straight extension 41 with an inclined board-receiving surface portion 42.

Figure 8:
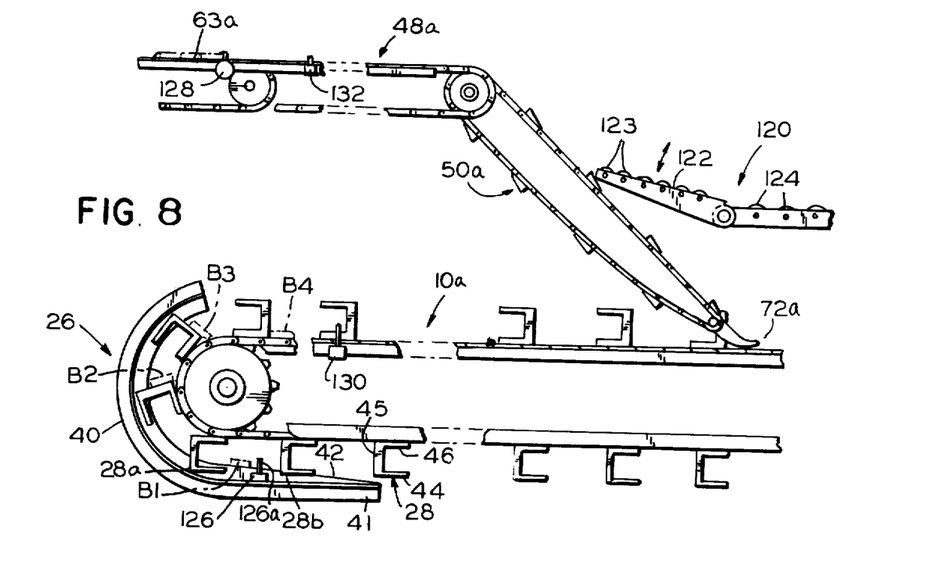
FIG. 8 is an enlarged side elevational view of the upwardly traveling end portion of the drop sorter shown in FIG. 1 in conjunction with a modified infeed conveyor system.

Each lumber-supporting hook 28 shown in FIG. 8 includes a lumber-supporting arm portion 44 that is generally horizontal when the hook travels along the lower run. The hook also has a vertical arm portion 45 which depends from another horizontal arm portion 46 which is attached to the sorter chain. Vertical arm portion 45 serves as a board-pushing means for pushing a board about curved slideway 40 to the upper run in the sorter's recirculating function. As a hook 28 proceeds toward upwardly traveling end run 26 carrying a board to be recirculated, lumber-supporting arm 44 of the hook deposits a board, for example board $B_1$, on the progressively inclined surface portion 42 of slide extension 41.

Thereafter the next-following hook pushes the board up and about curved slide 40, as shown for example with respect to board B₂, and progressively back onto the upper run of the sorter, as shown with respect to boards B₃ and B₄. After the board is back on the upper run, it is eventually reconveyed into its original set of hooks, as will become more apparent as the description proceeds.

Although the recirculating portion of the sorter of FIG. 8 is shown in conjunction with a modified form of infeed system, the drop sorter shown in FIG. 8 is identical to the drop sorter shown in FIG. 1, and therefore the same reference numbers identify corresponding portions of both figures.

INFEED SYSTEM

The illustrated infeed system 32 of FIG. 1 is an overhead type, so-called because it extends above and over at least a portion of the length of the drop sorter and feeds boards along a descending infeed path onto upper run 20 of the sorter conveyor. The overhead infeed of FIG. 1 includes a long horizontal infeed conveyor section 48 paralleling the drop sorter and a descending sloped infeed conveyor section 50 extending downwardly from the offbear end of horizontal infeed section 48 to a lower end terminating at a level closely adjacent to upper run 20 of the sorter. The overhead infeed system is supported by a series of vertical frame legs 52 carried by I-beams 53 spanning longitudinal frame supports 54. These in turn are supported from ground level by long columns 56, some of which are also used to support sorter trusses 12.

In the embodiment of FIG. 1, the overlying horizontal infeed conveyor section 48 is of considerable length so that well-known board-processing functions preliminary to sorting can be carried on over the sorter as the boards proceed toward descending infeed conveyor means 50. The overhead infeed section shown includes an inclined transfer conveyor section 58 which may lead from the sawmill to a conventional unscrambler conveyor section 60 where closely grouped boards are separated and fed one at a time onto a horizontal conveyor table 61 where the boards may be graded either automatically or manually. From table 61 the boards proceed on a slick chain conveyor to a conventional board feeder 63 where the boards are fed at predetermined intervals from the slick chain to a lugged chain, usually so that one board occupies each lug space. The lugged chain carries the boards over a series of ending rolls 62 which align the ends of the boards against an end stop preparatory to an end-trimming operation. From the ending rolls the lugged chains carry the boards through a conventional trimmer 64 where a series of saws cut the boards to various predetermined lengths. From the trimmer the boards proceed to another set of ending rolls 65 which position the boards transversely on the infeed conveyor according to length so that they will assume desired transverse positions on the drop sorter chains. From ending rolls 65, the boards proceed on lugged chains over an offbear conveyor section 66, where the boards are fed, usually singly, onto descending infeed conveyor 50.

All of the foregoing board-processing functions are normally carried out of an infeed conveyor section that extends endwise from one end of the drop sorter, thereby requiring a large amount of floor space in addition to the floor space normally occupied by the drop sorter itself. The telescoping of these board-processing functions over the drop sorter greatly reduces required floor space, thereby enabling a savings in cost, particularly if the sorting and infeed system is to be installed inside a building or otherwise under cover.

The foregoing-described overhead infeed system can be further modified to effect even greater cost savings and increased efficiency by transferring the typical board-processing functions just described from the overhead infeed conveyor section to the upper run of the sorter conveyor itself as illustrated in phantom lines at the right-hand side of FIG. 2. That is, the grading section 61 of FIGS. 1 and 2 could be transferred to the position 61a of FIG. 2 and associated manual or automatic grading means can be provided at 61b. Such grading section might include a conventional board-turning apparatus to turn each board from one side of the opposite side to facilitate accurate grading. Also, the ending rolls 62 on the left-hand side of FIGS. 1 and 2 could be transferred to the position 62a in conjunction with the upper run of the sorter chains if desired. In that event, the board feeder 63 would remain on the infeed section of FIG. 2 but the board trimmer 64 would be transferred to the position 64a. In such alternative arrangement ending rolls 65 and the lugged offbear conveyor section 66 would also remain in their previously described positions just upstream from the descending infeed conveyor section 50.

Additional board-processing functions can also be performed on the upper run of the sorter conveyor chains. For example, grade-stamping means 68 can be provided along upper run 20 for grade-stamping each board as it proceeds along the upper run. Furthermore, various board-measuring functions can be performed as the boards proceed along the upper run. For example, the boards can be automatically measured for length, width, thickness, species, moisture content and other characteristics, and this information input into conventional memory and sort selection equipment in the area shown at 70 along the upper run of the sorter chains. These latter functions are also usually carried out along the infeed conveyor section upstream of the sorter. Of course, if these board-processing functions are transferred to the upper run of the sorter chains, additional carrying chains might have to be added, but only in the areas of the added functions. Such added chains and rolls would correspond to the chains, rolls, and other features shown on the lefthand side of FIG. 2. By transferring these typical board-processing functions preliminary to sorting to the upper run of the sorter chains, the length of horizontal overhead infeed section 48 can be reduced appreciably, and therefore further cost savings can be realized.

A further advantage of grading, measuring and selecting the sort as a board travels on the upper run of the sorter is that the length of memory required in the information storage unit of the sorter control can be greatly reduced. Instead of needing to store information concerning a given board from the time it travels along the infeed section until the board possibly recirculates on the sorter and is finally diverted to a bin, a memory for boards graded and measured on the upper run only needs to store board information until a board passes from the upper run to the lower run and is diverted. Any recirculating board can be regraded and remeasured when passing for a second time along the upper run.

Although certain specified board-processing functions have been described, it will be appreciated that various other conventional board-processing functions preliminary to sorting are also applicable to the generally described overhead infeed system, either in addition to or substituted for the described functions.

Figure 5:
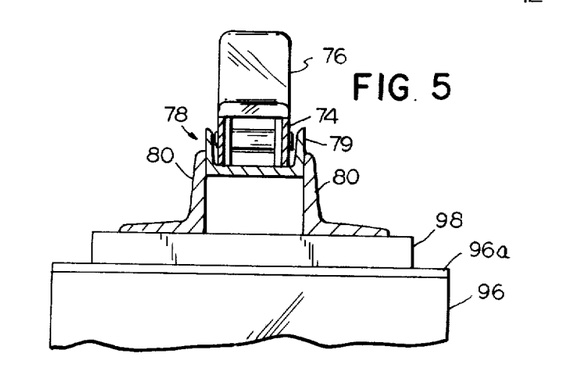
FIG. 5 is a sectional view taken along the line 5—5 of FIG. 3 but on a scale somewhat enlarged from that of FIG. 3.

The descending infeed conveyor means 50 is shown most clearly in FIGS. 2, 3, 4 and 5. Such means includes a descending lugged chain conveyor defining a sloped conveyor path extending from the offbear end of the horizontal infeed section 48 to an infeed point 72 at the upper run of the sorter conveyor. The descending lugged chain conveyor includes a series of four transversely spaced endless conveyor chains 74 having lugs 76 at equally spaced intervals along their lengths. The upper run of the lugged chain travels along a channel in a chainway 78. As shown in FIG. 5, each chainway 78 includes a channel member 79 and a pair of opposed angle members 80. The upper ends of the angle members carry a pair of bearings 82, which are in turn mounted for free rotation on the tail shaft 84 of horizontal infeed conveyor section 48. Lugged infeed chains 74 are trained about upper sprockets 86 fixed to tail shaft 84 so as to be driven thereby. The lower ends of lugged chains 74 are trained about smaller idler sprockets 88. Sprockets 88 are mounted on stub shafts 90 between extensions 91 of chainways 78. Each stub shaft 90 also pivotally mounts a short lumber slide 92 forming a lower end portion of the descending infeed conveyor means. The slide projects downwardly to a pointed and upturned end portion 93 terminating just above feed point 72 closely adjoining upper run 20 of the sorter conveyor to guide boards smoothly and gently onto the upper run in a flat position and with a minimum of shock.

Figure 3:
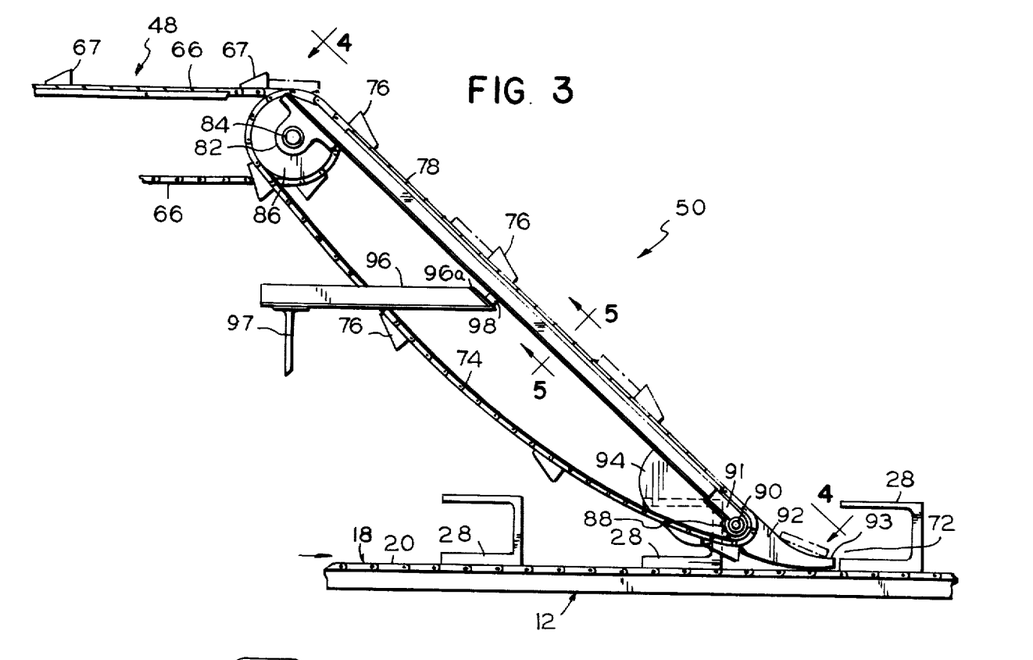
FIG. 3 is an enlarged side elevational view of the descending overhead infeed conveyor portion of the invention shown in FIG. 1.
Figure 4:
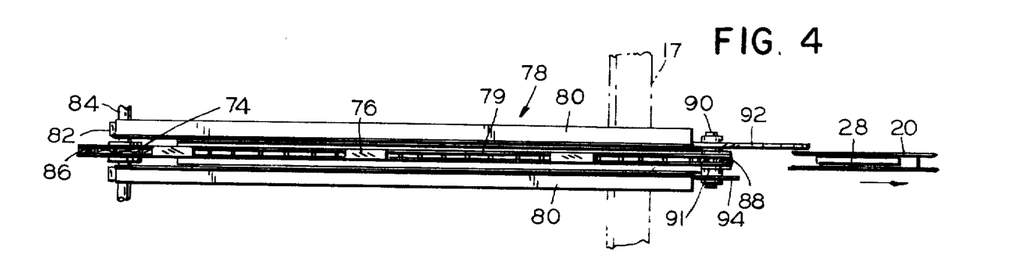
FIG. 4 is a top plan view taken along the line 4—4 of FIG. 3 on the same scale as FIG. 3.

In the illustrated descending conveyor, each driven lugged chain descends to a lower end that terminates below the upper level of hooks 28 on the upper run. Each such chain is also driven at a speed such that the lug positions on the infeed chains are correlated to the hook positions on the sorter chains so that each lug 76 releases a board into a hook space on the upper run. Thus the position of each board relative to its intended hook space is carefully controlled throughout most of its infeed path to ensure that the board will enter such space. As the speed of the sorter conveyor varies so also does the rate of delivery of boards to the sorter to maintain the desired timed relation between board position and hook space position so that boards continue to be fed into the hook spaces.

Because slide member 92 can pivot on stub shaft 90, any recirculating board traveling along upper run 20 of the sorter toward the feed point 72 will not jam against the slide member, but instead will force such member to swing upwardly out of the path of the recirculating board, thereby allowing the board to continue unimpeded past feed point 72. The lower end portion of each chainway 78 mounts a depending shoe plate 94 which serves to shield the descending conveyor from recirculating boards that might extend above the pivot point of slide 92. Any such board striking shoe 94 causes the entire descending infeed conveyor to swing upwardly about tail shaft 84 out of the way, permitting such board to pass by feed point 72 without jamming. When chainway 78 swings upwardly as described, lugged infeed chains 74 simply rotate about their upper sprockets 86 which, of course, are fixed to the tail shaft 84.

Each of the four descending lugged chain conveyors is maintained in a predetermined declining or downwardly sloping disposition by an abutment arm 96 fixed to a frame portion 97 of the overhead infeed supporting frame structure. The angled outer end 96a of abutment member 96 contacts a stop 98 affixed to the underside of chainway 78 to maintain the lugged chain conveyors at their desired angles of declination.

Although the illustrated descending infeed conveyor 50 is provided with lugs 76 to provide the desired controlled positioning and delivery of boards to the sorter hook spaces because of the relatively steep angle of descent shown, a controlled board positioning during descent and delivery could be provided without lugs by reducing the steepness of the slope to approximately 15 degrees or less from the horizontal, or to whatever slope is necessary to hold a board on the descending conveyor without sliding.

Means other than lugged or unlugged conveyor chains might also be used for providing the desired controlled board positioning with respect to its intended hook space during its infeed descent. For example, a series of driven conveyor rolls set at a slope angle that is less than the angle of repose of the boards might be used. Even idler rolls or skate wheels provided with a variable braking means might be used to control the rate of descent of the boards in timed relation to the speed of the sorter conveyor. Another board infeed position control means that might be used with varying degrees of success to time the delivery of boards to the position of a sorter hook space could include a slideway having a pitch or slope which varies with changes in the speed of the sorter conveyor chain. Another such means might include a differential drive between the sorter conveyor and the lugged horizontal infeed conveyor that would provide a selectively adjustable positioning of the lugs on the latter relative to the hooks on the former to provide the necessary board-positioning control. Such a differential device might permit the use of a constant-speed descending conveyor such as a fixed slideway to deliver boards from the horizontal infeed conveyor section to the upper run of the sorter.

Although the illustrated descending infeed conveyor terminates in a short slideqway that guides each board toward the desired hook and gently delivers it to the sorter chains, such slideway can, in fact, be eliminated. However, in such event it might be desirable to extend the descending infeed chain conveyor to a point closer to or even slightly below the upper run of the sorter conveyor to provide controlled delivery of boards all the way to the upper run.

In FIG. 3 the spacing between lugs 76 on the descending infeed conveyor is the same as the spacing between lugs 67 on the horizontal infeed conveyor section. This is desirable where these conveyor sections are driven at a 1:1 ratio to the sorter conveyor, these lug spacings also conveniently correspond to the spacing between hooks on the sorter conveyor. However, the distance between the feeding lug 67 and the offbear end of the horizontal infeed chain conveyor 66 and the corresponding receiving lug 76 at the upper infeed end of the descending infeed conveyor, as measured along the path of travel of a board in its transition between these two conveyors, is less than the spacing between lugs on either of the two chains. This reduces the distance the board must slide in traveling from the last lug 67 on the horizontal infeed conveyor 66 to the first lug 76 on the descending chain conveyor, and therefore also reduces shock to and possible bouncing of the board upon impact with the first lug 76.

BOARD-ACCELERATING MEANS

Figure 7:
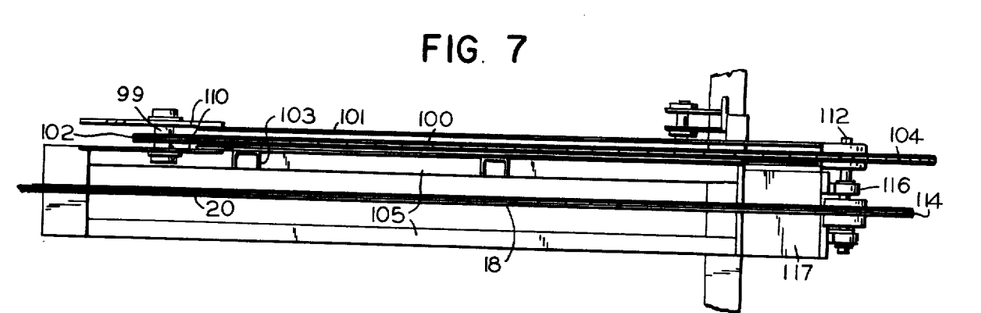
FIG. 7 is a top plan view of the portion of the sorter conveyor shown in FIG. 6.

As shown best in FIGS. 6 and 7, the downstream end portion of the sorter is provided with means for accelerating or otherwise moving boards while on the upper run into the forwardly adjacent hooks of the shorter conveyor or at least close enough to such hooks that the boards will enter the hooks on the downward end run. This acceleration means includes a speed-up chain 100, which is trained at one end about an idler sprocket 102 and at the opposite, extreme downstream end of the sorter about a large driven sprocket 104. The lower run 100a of speed-up chain 100 passes over a pair of idler sprockets 106, 107 and then along a lower chainway 108 en route to the idler sprocket 102. The upper run of the same chain rides on an upper chainway 101 supported by short posts 103 extending upwardly from a sprocket support beam 105. A stub shaft 99 carrying sprocket 102 is mounted in suitable bearings within slots 109 of a pair of mounting brackets 110 to provide for adjustment of the chain. Each bracket has an inclined upper surface 110a over which boards travel in passing from the upper run 20 of the primary sorter chains 18 onto the upper run of speed-up chains 100.

Drive sprocket 104 is mounted on the same shaft 112 that carries a sprocket 114 for the sorter conveyor chain 18 and is thereby driven by the same drive means that drives the sorter chains. Shaft 112 is mounted in suitable bearings 116 carried by a bracket 117 mounted on sprocket support beams 105.

As will be apparent from FIGS. 6 and 7, drive sprocket 104 for each speed-up chain 100 is larger than sprocket 114 for the sorter conveyor chain 18. Thus the peripheral speed of speedup sprocket 104 is greater than the peripheral speed of sorter chain sprocket 114, and as a consequence, the linear speed of the speed-up chain 100 is greater than the linear speed of the sorter chain. In the illsutrated embodiment the radius of speed-up sprocket 104 is approximately one-third greater than the radius of sorter sprocket 114. Therefore the speed of travel of the speedup chains is approximately one-third greater than that of sorter chains 18.

The length of the upper run of speed-up chain 100 is preferably sufficiently great that a board arriving at the left-hand end of the speed-up chain in FIG. 6 while abutting against a rearwardly adjacent carrier hook 28 will be accelerated into the forwardly adjacent carrier hook, or very nearly so, by the time the board arrives at the downwardly traveling end run 24 of the sorter. It will be noted that the upper run of speed-up chain 100 is at a level slightly above the inside surface of hook arm portion 46 attached to the sorter chain so that the speed-up chain can accelerate a board into the pocket defined by the hook without hanging up on such arm portion. With a board in the pocket of a hook 28 as the hook turns the corner and proceeds into the downward end run, support of the board will be gradually transferred from the speed-up chain to interconnecting arm portion 45 of the hook itself, and finally to the lumber-supporting arm portion 44 of the hook by the time the hook reaches the lower run.

Although the speed-up chain is shown at the downstream end of the upper run, such speed-up chain may be provided at any desired point along the upper run downstream of infeed point 72. In fact, the speed-up conveyor could be combined with the descending infeed conveyor to accelerate each board into its hook immediately upon its descent onto the upper run of the sorter. This could be done by driving the descending infeed conveyor at a slightly higher speed than the sorter conveyor so that the horizontal component of the descent speed matches the horizontal speed of the sorter. Then a short horizontal speed-up conveyor section driven from and in a 1:1 ratio to the descending conveyor and extending downstream from the descending conveyor along the upper run from the feed point would accelerate each board delivered into a set of sorter hooks early in its travel along the upper run.

Alternatively, by precise timing of the descending infeed conveyor with the sorter conveyor, the descent of boards to the sorter might be closely controlled so that each board is delivered into a set of hooks on the upper run directly from the descending infeed conveyor. In this described modification, the accelerating means would be embodied in the descending infeed conveyor means.

FIG. 8 MODIFICATION

The modification of FIG. 8 includes a drop sorter 10a that is of itself identical to the drop sorter of FIG. 1. The horizontal infeed section 48a of the drop sorter modification of FIG. 8 may also be identical to the corresponding section of the overhead infeed for the sorter as shown in FIGS. 1 and 2. However, the descending infeed section 50a of the FIG. 8 modification differs from the descending infeed portion 50 of the sorter of FIG. 1 in that a bypass conveyor 120 extends generally horizontally from the descending conveyor section 50a at a vertical level between the infeed and outfeed ends of the descending conveyor. The bypass conveyor is adapted to divert boards from the descending conveyor section 50a to bypass drop sorter 10a. For this purpose bypass conveyor 120 has a diverter arm 122 capable of pivoting between the diverting position shown upwardly to an inactive position. In the latter position of the diverter arm, boards descending along infeed conveyor section 50a are delivered to the upper run of drop sorter 10a.

In the illustrated bypass conveyor, diverter arm 120 includes a series of skate wheels 123 which convey boards by gravity onto driven rollers 124 of the horizontal portion of the bypass conveyor 120. Of course, any other suitable conveyor means can be used instead of the skate wheels and driven rollers shown. Also, any number of bypass conveyors can be provided along the descending conveyor, within space limitations determined by the vertical distance between infeed conveyor 48a and the upper run of drop sorter 10a. Such bypass conveyors might be used, for example, to divert any boards that might be unsuitable for collection in the various bins of the drop sorter or which might not otherwise fall into any of the various categories of boards which the drop sorter is programmed to sort. In a sense, the modification of FIG. 8 combines the advantages of a drop sorter with characteristics of a tray sorter insofar as the bypass conveyors are concerned.

Like the horizontal overhead infeed section 48 of the FIG. 1 sorter system, the corresponding infeed section 48a of the FIG. 8 sorter system includes a board feeder 128 for feeding boards at intervals into lug spaces of a downstream lugged conveyor. Although it may be desirable in some circumstances to have the descending conveyor feed a board into a hook space already occupied by a recirculating board, such as when two boards are of the same size and grade so that both can be discharged into the same sorter bin, in the more usual situation it is desirable to have each hook space and thus each hook occupied by only a single board. Thus in the embodiment of FIG. 8, means are provided for ensuring that descending infeed conveyor 50a does not feed a board into a hook space on the sorter that is already occupied by a recirculating board. Such means includes a limit switch 126 mounted on the slideway 40 having a sensing means 126a adapted to sense the presence of a board, such as board $B_1$, in the hook space between sorter hooks 28a and 28b. The hook space occupied by limit switch 126 is the same distance in hook spaces from feed point 72a on the upper run of the sorter as the board feeder 128 is in lug spaces from such feed point. When limit switch 126 senses the presence of a recirculating board in a hook space, it transmits a signal to feeder 128 to prevent such feeder from feeding a board into the corresponding lug space on the infeed conveyor. This result may be accomplished using conventional electrical circuitry familiar to any electrician familiar with lumber-processing equipment.

A second limit switch 130 is provided along the upper run of the sorter at the same distance, measured in hook spaces, from feed point 72a as a third limit switch 132 on the infeed conveyor section 32a, measured in lug spaces. This secondary system of switches is arranged electrically so that if switch 130 on the sorter should sense a board in a hook space at the same time that limit switch 132 senses a board in a corresponding lug space, drive motor 30 will stop to shut down the entire infeed and sorter conveyor systems until the situation is corrected by removing one of the two boards. Such secondary switch system provides a backup safety means for the previously described board feeder shut-off system, should the latter fail to function.

PROBLEM DETECTION AND CORRECTION MEANS

Additional limit switches and other problem detection means can be provided along the upper run of the drop sorter to detect problems that might otherwise cause a malfunction of the sorter. For example, with reference to FIG. 2, badly skewed boards traveling along the upper run of the sorter are detected by a series of limit switches 136 positioned in the path of travel of the lumber along the upper run. These switches include a master skew switch 136a and three in-line skew switches 136b, 136c, 136d positioned slightly downstream of the master switch. The master switch is positioned near the imaginary longitudinal lumber line defined by one end of boards traveling along the upper run of the sorter. The other switches are spaced across the sorter at intervals, such as every five feet, from the lumber line.

The three aligned skew switches are connected in parallel with one another, but in series with the master skew switch in an electrical circuit that includes a relay for deactivating the sorter and infeed conveyor systems and a manual reset switch for restarting such conveyor systems. Master skew switch 136a is normally closed, and the three aligned skew switches are all normally open. Thus when a board travels downstream on the upper run of the sorter conveyor, properly positioned transversely with respect to its direction of travel, such board will first contact master switch 136a to open it and shortly thereafter will contact at least one of the three aligned switches to close the latter while the master switch remains open. Thus a properly positioned board does not complete the circuit to the system shut-off relay. However, if a board traveling along the upper run is badly skewed so that one portion of it closes one of the three aligned switches before it opens master switch 136a, the skew circuit is completed to energize the shut-off relay, which de-energizes drive motor 30 to shut down the conveyor systems. The systems remain shut down until the operator presses the circuit reset button, which he will usually not do until the skewed board is removed or corrected. The same result occurs if a board is badly skewed in the opposite direction on the upper run so that a portion of the board opens and recloses before it closes one of the aligned skew switches. Any one of a number of conventional electrical circuits, well known to any electrician in the field, can be used to effectuate this result using the master switch and series of aligned skew switches described. The skew circuit can also include a warning lamp that lights on a control panel to indicate to the operator that a board is skewed at the same time the conveyor systems are shut down by such board.

Other problem-detecting means can be provided along the upper run in addition to the skew switches just described. For example, other limit switches could be provided for detecting broken boards, bent hooks or boards riding on top of hooks along the upper run.

It is desirable to feed boards onto the upper run of the sorter conveyor so that they lie flat on the sorter chains. This ensures proper insertion of each board into its intended hooks. In the event that a board is fed so that it stands on edge or leans against a hook as it travels along the upper run, means are provided for shaking or vibrating the board to the desired flat position as it travels along the upper run. Such shaking means in the illustrated embodiment includes one or more series of skid plates 140, as shown in FIGS. 2 and 6, one in conjunction with each sorter conveyor chain. Skid plate 140 has an upper surface that rises to a level above the upper surface of the sorter conveyor chains to define a bump in the conveyor path that will jolt any on-edge or leaning board to a flat position.

OPERATION

In operation, the sorter infeed, shown best in FIG. 3, provides a controlled, positive descent and delivery of each board onto the upper run of the sorter chains. The board delivery is controlled in that each board is fed to the upper run in timed relation to the speed and position of the sorter conveyor hooks in a manner so that the board enters a designated hook space on the upper run. Any variation in the speed of the sorter conveyor causes a corresponding variation in the timing of the infeed of each board to the sorter so that a board continues to be fed into each hook space. In the embodiment of FIG. 1, this timing is accomplished using a lugged descending conveyor, the speed of which varies with variations in the speed of the sorter conveyor so that the relative positioning of the lugs and hooks does not change. The controlled timed delivery in the illustrated embodiment continues to a point below the upper limit of sorter hooks 28 so that when a board is released by the driven descending lugged conveyor 50 onto the slideways 92, such board is already within the space between hooks and cannot escape, therefore ensuring proper delivery.

It is the foregoing controlled delivery of boards to the upper run of the shorter in timed relation to the shorter conveyor that distinguishes this feature of the present invention from other infeeds, such as the overhead infeed shown in FIG. 8 of prior U.S. Pat. No. 2,902,150 utilizing descending slideways down which a board slides through a substantial distance to the sorter conveyor in an uncontrolled manner. A slideway, absent associated compensating control features, provides an uncontrolled delivery because it is essentially a constant speed device that is inherently incapable of timing the arrival of a board on the upper run so that each board always occupies the same general position on the upper run relative to the sorter hooks regardless of the speed of the sorter conveyor. The inherently uncontrollable nature of a long slideway is also increased by the fact that different boards will descend along the slideway at different speeds because of their varying coefficients of friction.

Although it is desirable to control the descent of a board onto the upper run of the sorter chain to a point closely adjacent to the upper run by extending the lugged descending conveyor to a terminal point closely adjacent the feed point of the upper run, this is not an absolutely essential feature. In fact, the descending infeed conveyor can be terminated at a level above the hooks traveling along the upper run so as to drop the boards a short distance into the lug spaces on the upper run. Although the shock to both the boards and the sorter would be greater and timing would not be as accurate with such an arrangement, this variation of the descending infeed would eliminate the need for an upwardly swinging or otherwise movable descending infeed conveyor in a drop sorter of the recirculating type.

Summarizing, a complete operating cycle of the infeed and sorter system as shown in FIG. 1 is as follows: A board ascending the transfer chain 58 is separated from other boards with which it may be comingled at the unscrambler 60 and then fed onto the horizontal transfer table 61 where it is graded manually or automatically and measured. Then the board passes over ending rolls 62 to align one end of the board with the corresponding ends of other boards. From ending rolls 62 the board passes to lumber feeder 63 which feeds it into a lug space of a lugged conveyor. The lugged conveyor carries the board through trimmer 64 where it is cut to a predetermined length. From the trimmer the board passes over ending rolls 65 which align the board properly according to length for correct positioning on the sorter chains.

Then the board passes to a lugged transfer chain section 66 which feeds the board behind a lug of descending lugged chain conveyor 50. The descending conveyor feeds the board into a hook space on the upper run 20 of drop sorter 10. Near the downstream end of the upper run, the board is accelerated by speed-up chains 100 into the forwardly adjacent set of hooks 28, after which the hooks containing such board travels around the downwardly traveling end run 24 of the sorter and along the lower run 22. While traveling along the lower run the board is brushed by a diverter arm 36 into a preselected cart 34 with other boards of the same classification. The cart into which the board is dropped is determined by a sort selector utilizing means, well known in the art, as the board is graded and measured, either while traveling along the horizontal section of the overhead infeed conveyor or while traveling along the upper run of the sorter. The sort selector includes a memory unit which stores board information fed to it until the board drops into a designated cart.

If the board is to be recirculated for any reason, it travels the full length of the lower run to the recirculating end 26 of the sorter where it is pushed by following sorter hooks up and around a curved slideway back onto the upper run within the same lug space that it previously occupied. When this occurs, the board travels the full length of the upper run and is again accelerated into the same hooks that it previously occupied. The hooks again carry the board along the lower run, but this time the board is deposited in the desired cart.

The sorter system described is usually operated by feeding only one board at a time into a given hook space of the sorter. However, in special situations, such as when many small boards are being sorted and two or more boards in succession may frequently be destined for the same sort because of their identical grade and dimensions, it may be possible to feed two or more boards at a time into a given hook space and carry such boards simultaneously in a single set of hooks to the desired sorting station. The principal advantage of such a multiple feed would be in increasing the output capacity of the sorter.

Although the present invention has been described with respect to a drop sorter having rearwardly opening hooks, the invention can also be applied to a sorter in which the hooks face forwardly. Thus, for example, the upper run of the sorter of FIG. 8 could move toward end 26. In such case the boards $B_4$, $B_3$, $B_2$ and so on would ride the back of a hook down and around the curved slide 40 at end 26 and would momentarily come to rest on inclined slide surface 42, to be picked up by the next following hook. Recirculation at the opposite end would be inherent because of the forwardly opening hooks. Boards could be discharged into designated bins by tipping the hooks downwardly over such bins.

The invention also has beneficial application to drag-type sorters which operate by dragging or pushing boards at intervals along rails using lugged driven chains or downwardly projecting arms from an overhead chain to do the pushing. The lower run of the rails includes downwardly movable diverter arms to divert boards into selected bins, trays or other collecting means. This type of sorter does not require any means for moving the boards into designated hooks or against the lugs. Thus the invention can be adapted for use with any endless conveyor-type sorter utilizing spaced positive board-conveying elements to move the boards along the endless board-conveying path.

The invention can also be applied to endless-type sorter conveyors in which either the "upper" run or the "lower" run, or both, are not horizontal but instead extend at an inclination or declination from the horizontal. Also, the overhead feed conveyor need not extend horizontally or parallel to the upper run of the sorter conveyor. A common example of such a sorter is the traytype sorter in which a drag-type primary sorter conveyor moves boards by means of lugs up or down a sloped path and diverter arms divert the boards selectively into various trays extending obliquely from the sloped path. In this case the "upper run" of the primary sorter conveyor to which boards are fed in accordance with the invention would be the run opposite the diverting run. In this application, as well as in the drag sorter application previously described, means must be provided at one end of the sorter conveyor, depending on direction of flow, to prevent the boards from falling from the conveyor.

The term "hook spaces" as used in this specification and claims has reference to the total space between upright portions of adjacent hooks or other positive board-conveying elements on the upper run, including the space within a hook opening.

Having illustrated and described what is presently a preferred embodiment of the invention as well as several possible modifications and variations thereof, it should be apparent to those skilled in the art that the same permits of various modifications in arrangement, detail and features. We claim as part of our invention all such modifications as come within the true spirit and scope of the following claims.

We claim:

1. A method of feeding lumber to a lumber sorter having a series of longitudinally spaced-apart and driven lumber-carrying hooks for conveying boards along an endless conveyor path defining upper and lower runs, a downwardly traveling end run and an upwardly traveling end run, said method comprising:

feeding boards of lumber transversely of their lengths along an infeed path over said upper run toward said upper run while controlling the positions of said boards along the infeed path in relation to the positions of said hooks along said upper run in a manner so as to deliver each board into a space on said upper run between longitudinally adjacent hooks traveling along said upper run, and moving each board toward a forwardly adjacent hook while traveling along said upper run.

2. The method of claim 1 including processing at least some of said boards as they travel along said upper run.

3. The method of claim 1 including sensing a sorter problem while a board that may be affected by such problem is on the upper run and correcting such problem in response to such sensing while the board is still on the upper run.

4. The method of claim 1 including delivering said boards onto said upper run at a feed point between the opposite ends of said upper run.

5. The method of claim 1 including recirculating any board remaining in a hook at the downstream end of said lower run by conveying said remaining board about said upward end run and back onto said upper run, conveying the recirculated board along said upper run past said feed point, and again moving the recirculating board on said upper run toward the hook previously occupied by such recirculating board to return such board to said lower run for deposit at a selected sorting station or continued recirculation.

6. A method of feeding lumber to a lumber sorter having a series of longitudinally spaced-apart and driven positive board-conveying elements for conveying boards along an endless conveyor path defining upper and lower runs, a downwardly traveling end run and an upwardly traveling end run, said method comprising:

feeding boards of lumber transversely of their lengths along an infeed path over said upper run toward said upper run while controlling the positions of said boards along the infeed path in relation to the positions of said elements along said upper run in a manner so as to deliver each board into a space on said upper run between longitudinally adjacent elements traveling along said upper run, processing at least some of said boards as they travel along said upper run, said processing including moving boards endwise transversely of said sorter chains while they are on said upper run.

7. The method of claim 6 including sensing the position of each board on said upper run and correcting the position of an improperly positioned board in response to a sensing while the improperly positioned board is on said upper run.

8. A method of feeding lumber to a lumber sorter having a series of longitudinally spaced-apart and driven positive board-conveying elements for conveying boards along an endless conveyor path defining upper and lower runs, a downwardly traveling end run and an upwardly traveling end run, said method comprising:

feeding boards of lumber transversely of their lengths along an infeed path over said upper run toward said upper run while controlling the positions of said boards along the infeed path in relation to the positions of said elements along said upper run in a manner so as to deliver each board into a space on said upper run between longitudinally adjacent elements traveling along said upper run, shaking said boards as they travel along said upper run to encourage said boards to lie flat as they approach said downwardly traveling end run.

9. A lumber-sorting system comprising:

a sorter including an elongate, endless sorter conveyor means having upper and lower runs, a downwardly traveling end run and an upwardly traveling end run, a series of lumber-carrying hook means spaced along said conveyor means, infeed means for feeding boards of lumber at predetermined intervals and transversely of their lengths onto said upper run in the spaces between adjacent said hook means, and board-moving means for conveying a board toward a forwardly adjacent hook means on said upper run at a speed greater than the speed of said sorter conveyor means such that said board at least closely adjoins said hook means by the time said board arrives at said downwardly traveling end run.

10. Apparatus according to claim 9 including lumber-recirculating means operable at said upwardly traveling end run for returning boards from said lower run to said upper run, and control means operable to prevent said infeed means from feeding a board into a space on said upper run occupied by a board returning from said lower run.

11. Apparatus according to claim 9 including lumber-recirculating means operable at said upwardly traveling end run for returning designated boards from said lower run to said upper run, said infeed means including means permitting said returning boards to travel along said upper run without interruption past said infeed means.

12. Apparatus according to claim 9 including means positioned along said upper run downstream of said infeed means for shaking boards traveling along said upper run in a manner to encourage said boards to lie flat while traveling along said upper run.

13. Apparatus according to claim 9 wherein said infeed means is disposed above said upper run and includes a descending conveyor means descending toward said upper run.

14. Apparatus according to claim 13 wherein said descending conveyor means includes means controlling the descent of boards therealong in timed relation to the positioning of said hooks on said sorter conveyor means so as to deliver boards into the spaces between hooks on said upper run.

15. Apparatus according to claim 13 wherein said descending conveyor means includes a driven lugged conveyor means.

16. Apparatus according to claim 13 including overhead feed conveyor means spaced above and overlying at least a portion of said upper run for delivering boards transversely to said descending conveyor means, said descending conveyor means extending downwardly from the offbear end of said overhead feed conveyor means toward said upper run.

17. Apparatus according to claim 13 wherein additional lumber-processing means is provided along said overhead feed conveyor means for processing said boards as they approach said descending conveyor means.

18. Apparatus according to claim 9 including lumberprocessing means positioned along said upper run downstream of said infeed means for processing boards traveling along said upper run.

19. Apparatus according to claim 18 wherein said processing means includes transverse conveyor means for shifting boards endwise on said upper run to predetermined positions with respect to said sorter conveyor means.

20. Apparatus according to claim 18 wherein said processing means includes board-turning means for turning over said boards as they travel along said upper run.

21. Apparatus according to claim 9 including sensing means for sensing the presence of an improperly positioned board on said upper run.

22. Apparatus according to claim 9 including means for sensing the presence of a skewed board on said upper run.

23. Apparatus according to claim 10 wherein said control means includes means for sensing the presence of a recirculating board.

24. Apparatus according to claim 9 including bypass conveyor means extending from said infeed means over said upper run and diversion means operable to selectively divert boards from said infeed means onto said bypass conveyor means to bypass said upper run.

25. Apparatus according to claim 9 wherein said board-moving means comprises a driven means for positively moving a board toward a forwardly adjacent hook means.

26. Apparatus according to claim 9 wherein said sorter conveyor means is drivable at a variable speed and said board-moving means comprises a driven speed-up conveyor means extending along and slightly above said upper run downstream from the point where said infeed means feeds boards onto said upper run, said speed-up conveyor means being driven at a speed greater than the speed of said upper run and being driven so that the speed of said speed-up conveyor means is a predetermined ratio of the variable speed of said sorter conveyor means.

27. In a lumber-sorting system including a continuously driven endless sorter conveyor chain means defining upper and lower runs, a downward end run and an upward end run with said conveyor chain means including multiple horizontally spaced-apart parallel conveyor chains having positive board-conveying hook means attached thereto at spaced intervals along its length for carrying and sorting boards along said lower run,
 said hook means being attached to said conveyor chains so as to open in a direction rearwardly of the direction of travel of said chains,
 an infeed apparatus for said system comprising infeed conveyor means extending over said upper run for conveying boards of lumber tranversely of their lengths,
 said infeed conveyor means including endless continuously driven multiple horizontally spaced-apart parallel descending conveyor chains positioned above and descending toward said upper run and being provided with lug means at spaced intervals therealong for conveying said boards at predetermined intervals therealong,
 said multiple descending conveyor chains corresponding in number to said multiple sorter conveyor chains and the effective overall width span of said multiple descending conveyor chains being coextensive with and at least substantially as great as the effective overall width span of said multiple sorter conveyor chains whereby said infeed apparatus and said sorter conveyor means can handle boards of greatly varying lengths,
 said lug means extending upwardly from an upper run of said descending conveyor chains and providing a controlled positioning of boards along said infeed conveyor means behind and in abutment against said lug means at positions correlated to the positioning of said hook means along said upper run and with the speed of said descending conveyor chains so as to time the delivery of each board from said descending conveyor chains to a feed point on said upper run with the arrival of a space between successive hook means at said feed point so that said descending conveyor chains deposit each board into a space between adjacent hook means on said upper run and immediately behind the said hook means intended to carry said board along said lower run.

28. Apparatus according to claim 27 wherein said infeed conveyor means includes a conveyor section overlying said upper run of said sorter conveyor chain means and having an offbear end terminating at the upper end of said descending conveyor chain means.

29. Apparatus according to claim 27 wherein said descending conveyor means descends along a sloping path toward the upper run of said sorter conveyor chain means.

30. Apparatus according to claim 27 wherein said infeed conveyor means includes a first lugged infeed chain section extending over and parallel to said upper run and said descending conveyor means comprises a second lugged infeed conveyor chain section declining from the offbear end of said first lugged chain section toward said upper run, the spacing between lugs on said first and second lugged chain sections being predetermined ratios of the spacing between said elements on said sorter conveyor means, said first and second chain sections being driven in timed relation to the speed of said sorter conveyor means, the lug-positioning on said first lugged chain section being related to the lug-positioning on said second lugged chain section such that the distance between any board-delivering lug at the offbear end of said first chain section and the corresponding board-receiving lug at the receiving end of said second chain section as measured along the path of travel of said boards is less than said spacing between lugs on said second chain section.

31. Apparatus according to claim 27 including means for moving a board on said upper run in the direction of travel of said sorter conveyor means at a speed greater than the speed of travel of said sorter conveyor means such that said board is caused to enter (a) forwardly adjacent said lumber-conveying hook means before said forwardly adjacent hook means proceeds along said lower run.

32. In a lumber-sorting system including endless sorter conveyor means defining upper and lower runs, a downward end run and an upward end run with said conveyor means including positive board-coveying elements spaced along its length,
   an infeed apparatus for said system comprising infeed conveyor means extending over said upper run for conveying boards of lumber transversely of their lengths,
   said infeed conveyor means including a descending conveyor means extending over said upper run for conveying boards of lumber transversely of their lengths,
   said descending conveyor means being positioned above and descending toward said upper run for conveying said boards at predetermined intervals therealong,
   and means providing a controlled positioning of boards along said infeed conveyor means correlated to the positioning of said elements along said upper run so as to time the delivery of boards from said descending conveyor to a feed point on said upper run with the arrival of a space between elements at said feed point so that said descending conveyor means deposits boards into said spaces between adjacent elements on said upper run,
   said descending conveyor means including a long driven upper portion having a lower end terminating above said upper run and a short slide portion extending downwardly from said lower end to a lower terminus closely adjacent to said upper run.

33. Apparatus according to claim 32 wherein said slide portion includes an upturned lower end portion operable to gradually merge the infeed path of said boards with the conveyor path along said upper run.

34. In a lumber-sorting system including endless sorter conveyor means defining upper and lower runs, a downward end run and an upward end run with said conveyor means including positive board-conveying elements spaced along its length,
   an infeed apparatus for said system comprising infeed conveyor means extending over said upper run for conveying boards of lumber transversely of their lengths,
   said infeed conveyor means including a descending conveyor means extending over said upper run for conveying boards of lumber transversely of their lengths,
   said descending conveyor means being positioned above and descending toward said upper run for conveying said boards at predetermined intervals therealong,
   and means providing a controlled positioning of boards along said infeed conveyor means correlated to the positioning of said elements along said upper run so as to time the delivery of boards from said descending conveyor to a feed point on said upper run with the arrival of a space between elements at said feed point so that said descending conveyor means deposits boards into said spaces between adjacent elements on said upper run,
   said descending conveyor means including means allowing at least a lower end portion thereof to move upwardly relative to said upper run to allow recirculating lumber to pass along said upper run without interference.

35. In a lumber-sorting system including endless sorter conveyor means defining upper and lower runs, a downward end run and an upward end run with said conveyor means including positive board-conveying elements spaced along its length,
   an infeed apparatus for said system comprising infeed conveyor means extending over said upper run for conveying boards of lumber transversely of their lengths,
   said infeed conveyor means including a descending conveyor means extending over said upper run for conveying boards of lumber transversely of their lengths,
   said descending conveyor means being positioned above and descending toward said upper run for conveying said boards at predetermined intervals therealong,
   and means providing a controlled positioning of boards along said infeed conveyor means correlated to the positioning of said elements along said upper run so as to time the delivery of boards from said descending conveyor to a feed point on said upper run with the arrival of a space between elements at said feed point so that said descending conveyor means deposits boards into said spaces between adjacent elements on said upper run,
   said descending conveyor means being mounted at its upper end for upward movement from a normally declining disposition.

36. In a lumber-sorting system including endless sorter conveyor means defining upper and lower runs, a downward end run and an upward end run with said conveyor means including positive board-conveying elements spaced along its length,
   an infeed apparatus for said system comprising infeed conveyor means extending over said upper run for conveying boards of lumber transversely of their lengths,
   said infeed conveyor means including a descending conveyor means extending over said upper run for conveying boards of lumber transversely of their lengths, said descending conveyor means being positioned above and descending toward said upper run for conveying said boards at predetermined intervals therealong, and means providing a controlled positioning of boards along said infeed conveyor means correlated to the positioning of said elements along said upper run so as to time the delivery of boards from said descending conveyor to a feed point on said upper run with the arrival of a space between elements at said feed point so that said descending conveyor means deposits boards into said spaces between adjacent elements on said upper run, said descending conveyor means descending to a level close to the level of said upper run and being mounted at its upper end for upwardly swinging movement from its normal declining disposition, said descending conveyor means including depending shoe means depending from a lower portion thereof toward said upper run for protecting said descending conveyor means from boards traveling along said upper run and for initiating said upwardly swinging movement upon contact with said boards.

37. A method of feeding lumber to a lumber sorter having elongate endless conveyor means with lumber-carrying hook means spaced along the length of said conveyor means, said conveyor means including generally horizontal upper and lower runs, a downwardly traveling end run and an upwardly traveling end run, said method comprising:

feeding boards of lumber transversely of their lengths from a point above said upper run along a descending conveyor path onto said upper run and delivering each board into an unoccupied space on said upper run between adjacent hook means, and then moving each said board delivered onto said upper run toward the forwardly adjacent hook means as said board travels along said upper run.

38. In a lumber-sorting system including endless sorter conveyor means defining generally horizontal upper and lower runs, a downwardly traveling end run and an upwardly traveling end run, with said sorter conveyor means including positive lumber-conveying elements spaced along its length for conveying and accurately positioning boards along said lower run, an infeed apparatus for said system comprising infeed conveyor means for feeding boards of lumber transversely of their lengths onto said upper run in the spaces between adjacent said elements at a feed point along said upper run spaced a substantial distance from said downwardly traveling end run, and means for processing said boards as they travel along said upper run between said feed point and said downwardly traveling end run.

39. In a lumber sorting system including endless sorter conveyor means defining upper and lower runs, a downwardly traveling end run and an upwardly traveling end run, with said sorter conveyor means including positive lumber-conveying elements spaced along its length, an infeed apparatus for said system including descending infeed conveyor means descending from an upper end spaced above said upper run toward said upper run along a declining conveyor path, and terminating at a lower end closely adjacent to said upper run, said infeed conveyor means being operable to deliver boards on at a time to an infeed point on said upper run at intervals timed so that one board can be delivered into each space between each adjacent pair of said elements, and means enabling at least a lower portion of said infeed conveyor means to move upwardly away from said upper run out of the path of travel of boards on said upper run, whereby boards can be recirculated on said sorter conveyor means from said lower run back to said upper run and past said infeed point.

40. A system according to claim 39 wherein said descending conveyor means includes at least a major conveyor portion driven in timed relation to said sorter conveyor means, said driven portion including a lower end terminating at a level below the upper level of said lumber conveying elements on said upper run.

41. A lumber-sorting system comprising:

a sorter including an elongate, endless sorter conveyor means having upper and lower runs, a downwardly traveling end run and an upwardly traveling end run, a series of lumber-carrying hook means spaced along said conveyor means, infeed means for feeding boards of lumber at predetermined intervals and transversely of their lengths onto said upper run in the spaces between adjacent said hook means, lumber-recirculating means operable at said upwardly traveling end run for returning boards from said lower run to said upper run within the spaces between hook means on said upper run initially occupied by said recirculated boards, and control means operable to prevent said infeed means from feeding a board into a space on said upper run occupied by a recirculating board returning from said lower run, including means for sensing the presence of a recirculating board.

* * * * *

UNITED STATES PATENT OFFICE
CERTIFICATE OF CORRECTION

Patent No. 3,894,625      Dated July 15, 1975

Inventor(s) John S. Boyle and R. Burl Romick

It is certified that error appears in the above-identified patent and that said Letters Patent are hereby corrected as shown below:

Column 4, line 14, between "at" and "sorter" delete "a"; Column 5, line 64, "of" should be --on--; Column 6, line 17, "of" should be --to--; Column 7 line 30, after "means" insert --50--; Column 8, line 47, "slidegway" should be -slideway--; Column 8, line 58, before "ratio", --speed-- should be inserted.

Column 8, line 58, after "1:1 ratio". insert --In a system where the infeed conveyors are also driven at a 1:1 ratio--; Column 8, line 62, "and" should be -at-- Column 9, line 11, "shorter" should be --sorter--
Column 9, line 44, "illsutrated" should be "illustrated--
Column 10, line 24, between "would" and "be" insert --thus--; Column 13, line 9, "shorter" should be --sorter-- (both occurrences);

Column 17, line 34, Claim 18, "berprocessing" should be --ber-processing--; Column 19, line 22, Claim 31, "(a)" should be --a--; Column 19, line 29, Claim 32,, "board-coveying" should be --board-conveying--

Signed and Sealed this thirteenth Day of January 1976

[SEAL]

Attest:

RUTH C. MASON
*Attesting Officer*

C. MARSHALL DANN
*Commissioner of Patents and Trademarks*